US008036978B1

(12) United States Patent  (10) Patent No.: US 8,036,978 B1
Saavedra-Lim  (45) Date of Patent: Oct. 11, 2011

(54) METHOD OF UPGRADING THIRD PARTY FUNCTIONALITY IN AN ELECTRONIC FRAUD MANAGEMENT SYSTEM

(75) Inventor: Frank S. Saavedra-Lim, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 646 days.

(21) Appl. No.: 09/475,950

(22) Filed: Dec. 31, 1999

(51) Int. Cl.
  *G06Q 40/00* (2006.01)
(52) U.S. Cl. .................... 705/38; 705/35; 705/39
(58) Field of Classification Search .............. 705/35, 705/38
  See application file for complete search history.

(56) References Cited

U.S. PATENT DOCUMENTS

| | | | |
|---|---|---|---|
| 4,947,028 A * | 8/1990 | Gorog | 235/380 |
| 5,239,462 A * | 8/1993 | Jones et al. | 705/38 |
| 5,252,811 A | 10/1993 | Henochowicz et al. | |
| 5,336,870 A | 8/1994 | Hughes et al. | |
| 5,426,281 A | 6/1995 | Abecassis | |
| 5,453,601 A | 9/1995 | Rosen | |
| 5,496,991 A | 3/1996 | Delfer, III et al. | |
| 5,497,317 A | 3/1996 | Hawkins et al. | |
| 5,557,516 A | 9/1996 | Hogan | |
| 5,590,325 A | 12/1996 | Kolton et al. | |
| 5,611,052 A * | 3/1997 | Dykstra et al. | 705/38 |
| 5,696,907 A * | 12/1997 | Tom | 705/38 |
| 5,732,400 A | 3/1998 | Mandler et al. | |
| 5,745,654 A * | 4/1998 | Titan | 706/20 |
| 5,774,882 A * | 6/1998 | Keen et al. | 705/38 |
| 5,790,645 A * | 8/1998 | Fawcett et al. | 379/189 |
| 5,819,226 A * | 10/1998 | Gopinathan et al. | 705/44 |
| 5,878,403 A * | 3/1999 | DeFrancesco et al. | 705/38 |
| 5,940,812 A * | 8/1999 | Tengel et al. | 705/38 |
| 5,953,710 A * | 9/1999 | Fleming | 705/38 |
| 5,970,478 A * | 10/1999 | Walker et al. | 705/35 |
| 6,014,645 A * | 1/2000 | Cunningham | 705/38 |
| 6,064,987 A * | 5/2000 | Walker et al. | 705/38 |
| 6,088,686 A * | 7/2000 | Walker et al. | 705/38 |

(Continued)

OTHER PUBLICATIONS

Jackson, "The upside and downside of VisaNet." Dec. 1990.*

(Continued)

*Primary Examiner* — Mussa Shaawat
(74) *Attorney, Agent, or Firm* — Brian A. Collins; Charles R. Malandra, Jr.; Steven J. Shapiro

(57) ABSTRACT

A method for managing and assessing a set of risks relative to a financial product, wherein said method is accessed through a data processing system. The data processing system comprises a series of nodes operatively connected with each other. The method begins by performing an application processing procedure, comprising a check of the creditworthiness of one or more selected customers; and issuing a financial product to the selected customer if that customer is determined to be creditworthy; and, declining the application if the customer is determined to be not creditworthy. After the card has been issued to a customer, the use of the card is assessed whenever the card is presented for payment of goods or services or to obtain a cash advance. The assessment is made as the result of a credit authorization request from a merchant or a system user and utilizes a predictive modeling routine to perform the assessment. The credit authorization is accepted or rejected as based upon an outcome of the assessment. The assessment results are then downloaded to the data processing system for transfer to a database accessible by one or more remote nodes of the system. Any of the transactions, assessments, or determinative calculations can be retained as a means of continually refreshing the pool of data available for credit determinations.

12 Claims, 17 Drawing Sheets

U.S. PATENT DOCUMENTS

| | | | |
|---|---|---|---|
| 6,094,643 A | 7/2000 | Anderson et al. | 705/44 |
| 6,112,190 A * | 8/2000 | Fletcher et al. | 705/36 R |
| 6,119,103 A * | 9/2000 | Basch et al. | 705/35 |
| 6,202,053 B1 * | 3/2001 | Christiansen et al. | 705/38 |
| 6,208,979 B1 * | 3/2001 | Sinclair | 705/38 |
| 6,263,447 B1 * | 7/2001 | French et al. | 726/5 |
| 6,311,169 B2 * | 10/2001 | Duhon | 705/38 |
| 6,317,517 B1 * | 11/2001 | Lu | 382/228 |
| 6,324,524 B1 | 11/2001 | Lent et al. | 705/38 |
| 6,330,546 B1 * | 12/2001 | Gopinathan et al. | 705/35 |
| 6,385,594 B1 * | 5/2002 | Lebda et al. | 705/38 |
| 6,405,181 B2 * | 6/2002 | Lent et al. | 705/38 |
| 6,567,791 B2 * | 5/2003 | Lent et al. | 705/38 |
| 6,658,393 B1 * | 12/2003 | Basch et al. | 705/38 |
| 7,177,836 B1 * | 2/2007 | German et al. | 705/40 |
| 7,813,944 B1 * | 10/2010 | Luk et al. | 705/4 |
| 2001/0011246 A1 * | 8/2001 | Tammaro | 705/38 |
| 2001/0014877 A1 * | 8/2001 | Defrancesco et al. | 705/38 |
| 2007/0136189 A1 * | 6/2007 | German et al. | 705/39 |
| 2007/0136192 A1 * | 6/2007 | German et al. | 705/40 |
| 2007/0143209 A1 * | 6/2007 | German et al. | 705/44 |

OTHER PUBLICATIONS

McKendrick, "In a New York minute?" Oct. 1997.*
Anonymous, "Fraudulent credit applications." Dec. 1983.*
Weisberg et al., "Hamstrung Adjusters Need Better Ways to Stop Fraud." Sep. 1995.*
Marlin, "New Card-Fraud System Upcoming at First Union." Sep. 1997.*
Porter, "Detecting Credit Application Fraud." 1997.*
Joelson, "Thwarting Credit Application Fraud." Mar. 1998.*
Ryman-Tubb, "Combating Application Fraud." 1998.*

* cited by examiner

FIG. 3

| F1 | Account Closure - Fraudulent Reinstatement Of Account | Account Takeover |
|---|---|---|
| F2 | Account Disputes And Chargebacks | Other |
| F3 | Account Information Changes In Writing - Address | Account Takeover |
| F4 | Account Information Changes Via Telephone - Adding Cardholder | Account Takeover |
| F5 | Account Information Changes Via Telephone - Address | Account Takeover |
| F6 | Account Information Changes Via Telephone - Business Name | Account Takeover |
| F7 | Account Information Changes Via Telephone - Abuse of Closed Account | Account Takeover |
| F8 | Account Information Changes Via Telephone - Cash Access Employee Accts. | Other |
| F9 | Account Information Changes Via Telephone - Changing PINs | Lost |
| F10 | Account Information Changes Via Telephone - Credit Limit Increase | Account Takeover |
| F11 | Account Information Changes Via Telephone - Disputed Statement | Other |
| F12 | Account Information Changes Via Telephone - Name | Account Takeover |
| F13 | Account Information Changes Via Telephone - Social Security Number | Account Takeover |
| F14 | Account Number - Fraudulent Use Via Telephone | Mail/Phone Order |
| F15 | Account Takeovers/Fraudulently Created Accounts | Account Takeover |
| F16 | Accounts - Live And Fraudulent - Detection | Fraudulent Applic. |
| F17 | Application - Fraudulent Card Applications - PreScreening | Fraudulent Applic. |
| F18 | Application Processing - Access To Account Documentation (paper files) | Account Takeover |
| F19 | Cardholder - Fraudulent Report Of Stolen Card | Account Takeover |
| F20 | Cardholder - Skip Accounts | Fraudulent Applic. |
| F21 | Floating - Balance Floating Between Several Accounts And Paid With Credit | Other |
| F22 | Internal - Collusion Between Card Ctr. Rep & Perpetrator | Other |
| F23 | Internal - Fee Collections And Funds Disbursements To Other Banks | Account Takeover |
| F24 | Issuing Card - Card Activation | NRI |
| F25 | Merchant - Purchase And Cash Advances On Single Ticket | Other |
| F26 | Plastic - Additional Card Request | NRI |
| F27 | Plastic Status - Card Intercepted In Mail | NRI |
| F28 | Plastic Status - Counterfeits | Counterfeit |
| F29 | Plastic Status - Lost | Lost |
| F30 | Plastic Status - Reissuing A Card | NRI |
| F31 | Plastic Status - Stolen | Stolen |
| F32 | Transactions - ATM Cash Advances | Lost |
| F33 | Transactions - Automatic Billing | Other |
| F34 | Transactions - Fraudulent Activity/Behavior | Lost |
| F35 | Transactions - International | Other |
| F36 | Transactions - Internet Purchases | Mail/Phone Order |
| F37 | Transactions - Misuse Of Card By Employee | Other |
| F38 | Transactions - Live Purchases | Lost |
| F39 | Transactions - Payments To Account | Other |
| F40 | Transactions - Telephone Purchases | Mail/Phone Order |

Fraud Loss Ratios

| Enter Month & Year mmm-yyyy | | Actual | Target |
|---|---|---|---|
| Flo = | Fraud Losses / Outstanding — Flo measures fraud losses as a function of total outstandings. The total outstandings is interpreted as a general measure of the portfolio maturity. This is used for benchmarking total fraud. | 0.00% | 0.00% |
| Flv = | Fraud Losses / Volume — Flv measures fraud losses as a function of volume of total sales. The total sales number is interpreted as an index of transaction activity. This is used for benchmarking transaction fraud. | 0.00% | 0.00% |
| Flc = | Fraud Losses / Total Charge-Offs — Flc is an indicator of the contribution fraud losses make to total charge-offs. | 0.00% | 0.00% |
| Le = | Σ(Fraudulent Credits - Fraudulent Losses) / Fraudulent Credits | 0.00% | 0.00% |
| FLp = | Fraudulent Credits - Fraudulent Losses | 0.00% | 0.00% |

FIG. 9

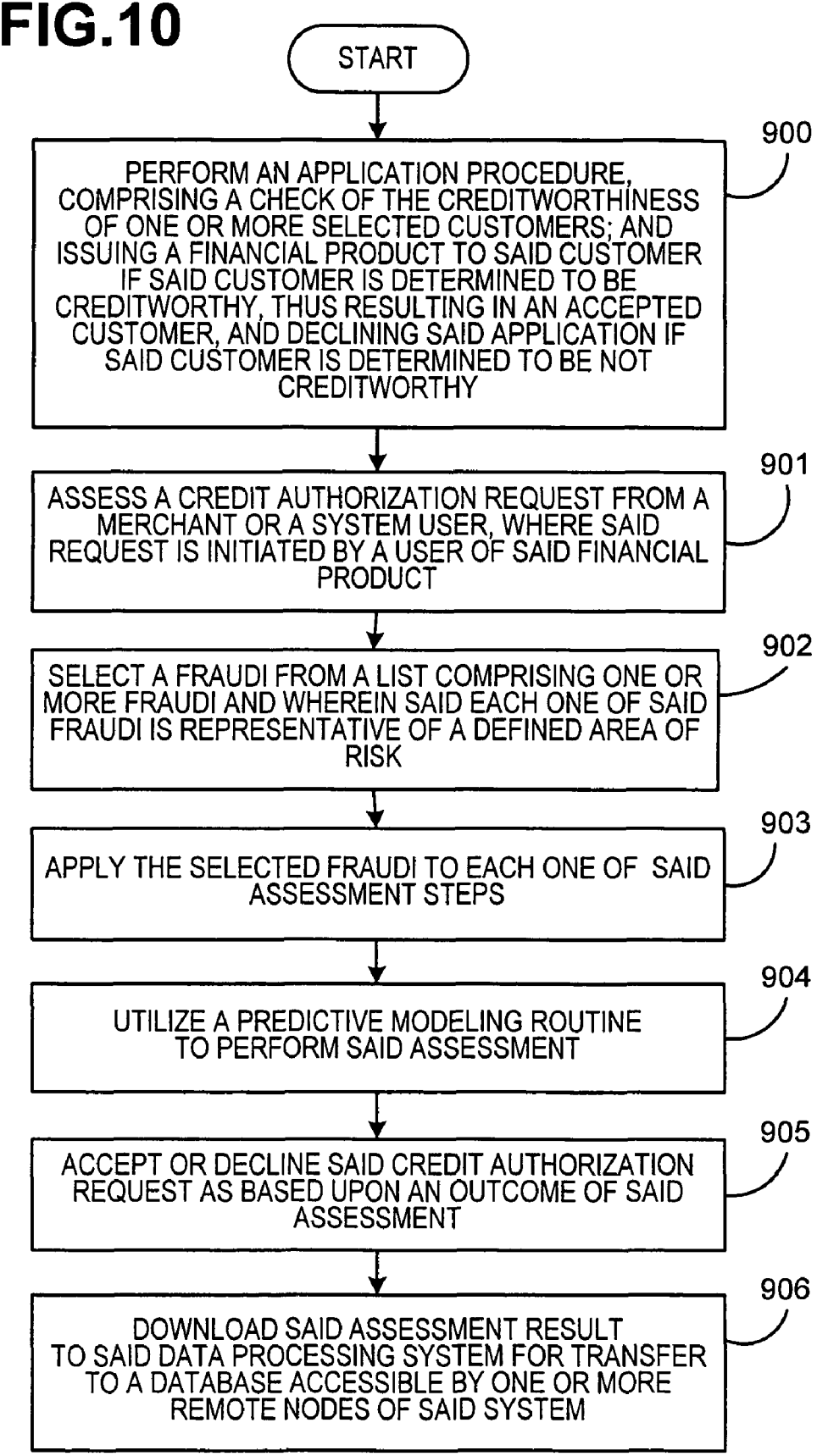

METHOD OF UPGRADING THIRD PARTY FUNCTIONALITY IN AN ELECTRONIC FRAUD MANAGEMENT SYSTEM

RELATED APPLICATIONS

Reference is made to application Ser. No. 09/475,948, entitled A METHOD AND SYSTEM FOR ELECTRONIC FRAUD/RISK MANAGEMENT, assigned to the assignee of this application and filed on even date herewith.

FIELD OF THE INVENTION

The present invention relates generally to the field of risk and fraud management with respect to financial products and more particularly to a method and system for managing risk by detecting credit card fraud through the full life cycle of a financial product and then benchmarking the performance.

BACKGROUND OF THE INVENTION

Within the financial industry in general there is a marked propensity for fraud which thus associates a certain degree of risk with each transaction or financial product introduction. This is particularly true in the credit card portion of the industry. Case history supports this conclusion. Fraud can, and does, originate both internally to the organization issuing the financial product, and externally, with customers, vendors, merchants, or criminals that intercept the communication of credit card information, electronically, or physically. Thus, fraud in this industry is expected.

Fraud is inherent in how credit cards are issued and handled. There is, for example, a significant threat to the issuer of a card from someone finding a lost credit card and using it to purchase gas in an automated gas station; and, telephone and mail orders may be made by criminals illegally possessing credit account information. In the same category, a fraudulent merchant may be operating fraudulently by selling merchandise on unequal consideration. On a larger scale, however, fraud rings are particularly active and include many players in their networks that defraud issuers of billions of dollars. Rogue employees and questionable merchants account for a significant part of skimming activity, which involves the illegal acquisition of account information in order to produce counterfeit cards or make fraudulent transactions. The sophistication of skimming is quite advanced in that criminals may wait up to eighteen to twenty (18-20) months after skimming a card before they use it. This category of fraud which originates at the point of sale is expected to be a twenty-five billion dollar ($25,000,000,000) problem in 1999.

Recent security conference statistics show that distinct trends emerge from studies of fraud. The top fraud types are lost, stolen, or counterfeit credit cards or accounts. Fraud losses resulting from lost and stolen credit cards (plastic) represent nearly sixty percent (60%) of all losses, with the fourth (4th) quarter of any year being the top fraud period. The hours of 12:00 Noon to 10:00 PM are the peak fraud activity times; California, Florida and New York are the top fraud states; and, Los Angeles, New York City, and Las Vegas are the top fraud cities. Telemarketing, phone use, and gas purchases are the top fraud industry groups.

While it is evident that fraud exists, and that it is extremely difficult to eliminate, even in the current technological environment, actions can be taken to control the impact of fraud. The credit card industry is not totally defenseless when it comes to fraud. It is evident that acquirers (merchants), issuers (banks), the major credit card associations (i.e., VISA® and MasterCard®), and third party vendors are making their best efforts to stay on top of the issue. The theme of fraud management is currently one promoting early detection and warning and loss mitigation as close as possible to the point of sale. There are a number of industry tools that are being employed to manage fraud and risk accordingly.

Applications for credit cards undergo scrutiny from such industry watchdogs and utilities as the VISA ICS (Issuer's Clearinghouse Service), from general information validation procedures, and from credit bureau fraud screen products such as SAFESCAN from Equifax, HAWK from TransUnion, or FACS from Experian. Transaction processing too, undergoes scrutiny from such industry methods as: the Fair Isaac Consumer Score (FICO); the Falcon—Neural Network Model (HNC); NESTOR—Neural Network Model; Queue Based Fraud Detection (TSYS DFS); the VISA Consumer Risk Score (CRIS); and, the VISA Magnetic Code Verification (CVV/CVC).

While the industry has taken steps to safeguard against fraud, it is recognized that the existing fraud detection technology (such as making calls to cardholders when a fraud is suspected) can impact desired customer service and convenience. Therefore, a balance is required in the state of fraud management that will allow the industry to protect itself while remaining commercially viable.

One aspect of progressive fraud management is the development of a concept, structure and effective method for allowing fraud to be identified, measured, and proactively managed at the task level. Another requirement for effective fraud management is the development of an ability to benchmark against the industry.

SUMMARY OF THE INVENTION

According to the invention, the object is achieved and the disadvantages of the prior art are overcome by a method for managing and assessing a set of risks relative to a financial product, wherein said method is accessed through a data processing system. The data processing system comprises a series of nodes operatively connected with each other. The method begins by performing an application processing procedure, comprising a check of the creditworthiness of one or more selected customers; and issuing a financial product to the selected customer if that customer is determined to be creditworthy; and, declining the application if the customer is determined to be not creditworthy.

After the card has been issued to a customer, the use of the card is assessed whenever the card is presented for payment of goods or services or to obtain a cash advance. The assessment is made as the result of a credit authorization request from a merchant or a system user and utilizes a predictive modeling routine to perform the assessment. The credit authorization is accepted or rejected as based upon an outcome of the assessment. The assessment results are then downloaded to the data processing system for transfer to a database accessible by one or more remote nodes of the system.

The assessment itself further comprises the steps of applying a transaction procedure to determine whether or not the credit authorization request is to be accepted or declined; and, then applying a fraudi set to the assessment methodology. The fraudi set serves to identify a set of risks associated with each step of the assessment. The credit authorization assessment methodology further comprises the steps of: performing a set of pre-processing checks; performing a set of transaction approval checks; performing a set of post processing checks;

and, making a set of post approval account adjustments required as a result of a credit authorization approval. On an individual transaction basis, each transaction can be accepted or declined as based upon an outcome of the assessment.

Any of the transactions, assessments, or determinative calculations can be retained as a means of continually refreshing the pool of data available for credit determinations.

BRIEF DESCRIPTION OF THE DRAWINGS

FIG. 3 is a table showing each of the Fraudi categories together with an industry primary fraud type cross-reference.

FIG. 9 is a block diagram of the application screen that allows a system user to determine fraud loss ratios as a means for benchmarking risk management effectiveness; and FIG. 10 is a flow chart describing the method utilized to perform this invention.

DETAILED DESCRIPTION OF THE PREFERRED EMBODIMENTS

Figure 1A:
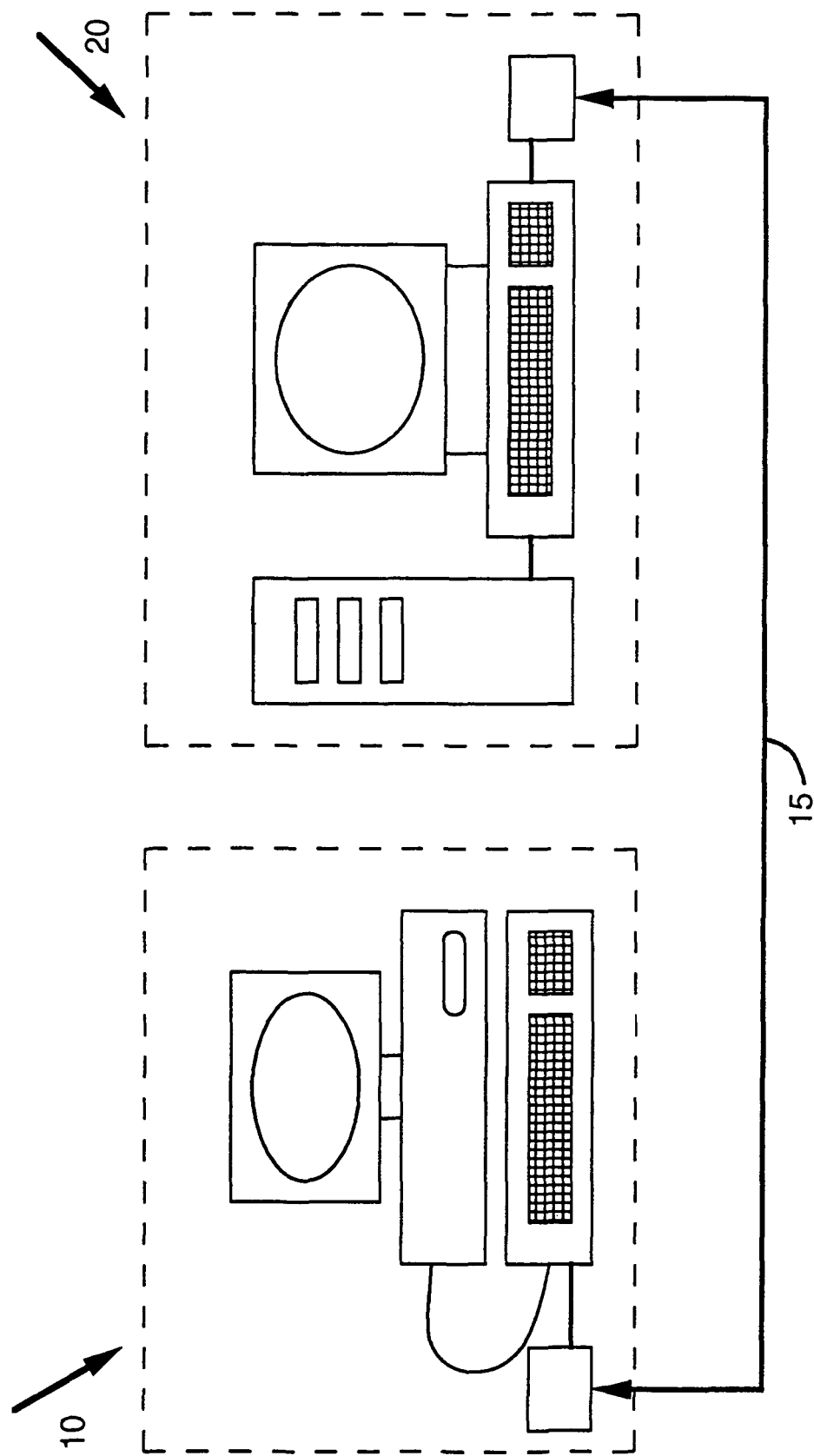
FIG. 1A is a diagram of the nodes comprising the system which is capable of supporting the underlying method of the present invention.

Beginning with FIG. 1A, there is shown a diagram of the nodes comprising the system which is capable of supporting the underlying method of the present invention. A system user, who wants to manage and assess the effectiveness of risk management measures, accesses the overall system through subsystem 10.

Subsystem 10 is shown as a node which includes a personal computer for processing data and running certain software applications, a monitor for providing a human interface with the personal computer so as to view screens established by the application, and a keyboard for data entry. A modem link is also included that will allow access to interface 15. Interface 15, in the preferred embodiment, is a network link that include an internet link; but, it is contemplated that the link could be any intranet or hardwired communication solution providing an interface with the component databases and data collection activities of the present invention.

Interface 15 links subsystem 10 with subsystem 20. Subsystem 20 is a remote server or data entry node which can monitor data input activities coming from credit card applications, industry data, downloaded data, and databases providing historical data. In an alternative embodiment of the present invention, subsystem 10 is one of a plurality nodes that can communicate with subsystem 20 either as part of an intranet, internet node, a traditional local area network (LAN), or a wide area network (WAN). A representative block diagram of various input elements of the overall system is shown in FIG. 1B.

Figure 1B:
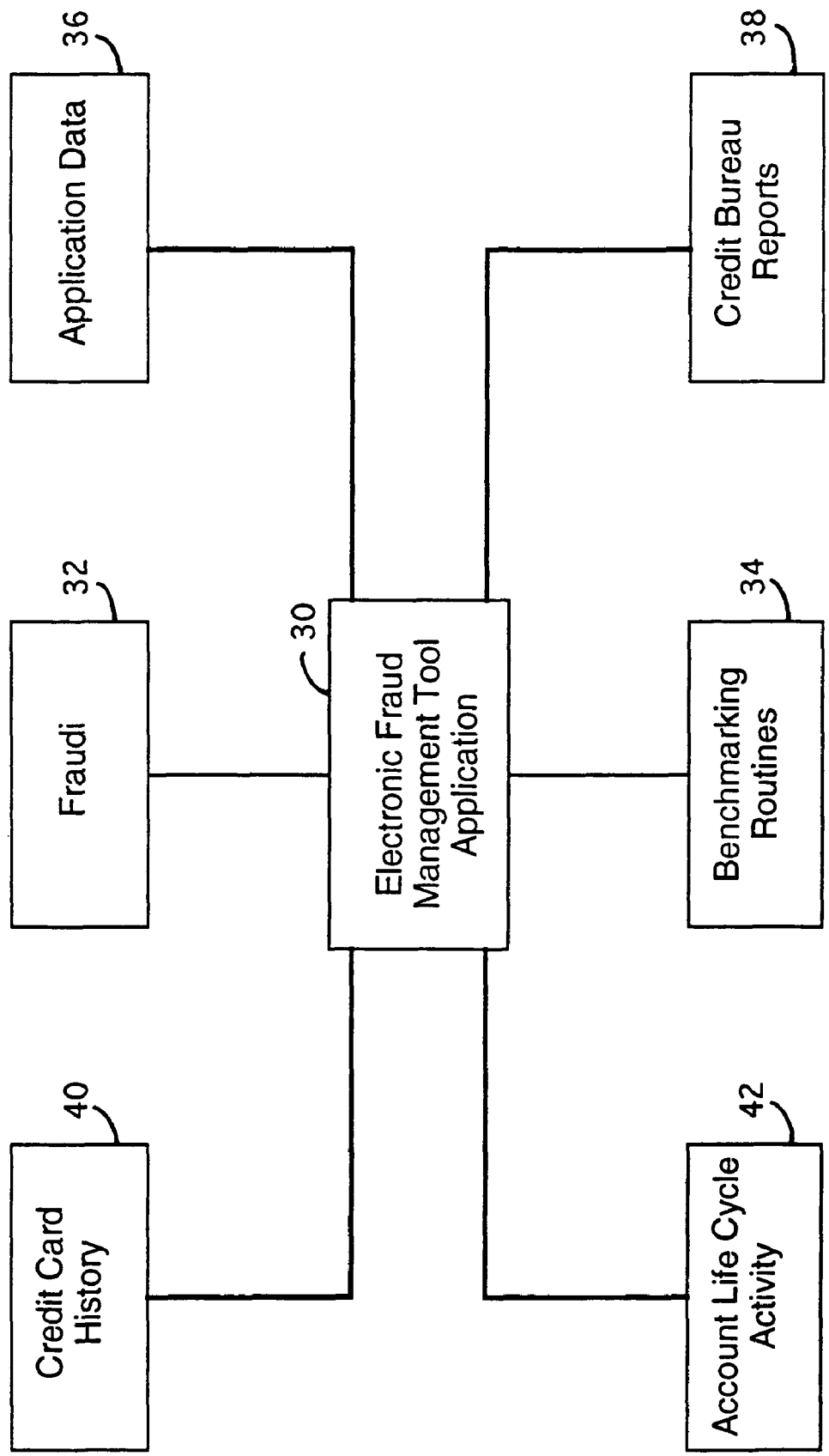
FIG. 1B is a block diagram of a system capable of supporting the underlying method of the present invention.

FIG. 1B is a block diagram of the system elements underlying the present invention. At the centerpoint of the system activity is the Electronic Fraud Management Tool 30 (hereinafter referred to as the "EFMT"), which is a software application running on the operating system of subsystem 10.

The EFMT 30 allows the system user to manage a financial product portfolio that is comprised of credit card accounts. The entries, which are not limited to the entry elements listed but are dynamic in that the entries can be adjusted by the system user, include: fraudi 32; benchmarking routines 34; application data 36; credit bureau reports 38; credit card history 40; and, account life cycle history 42. Additionally, the EFMT comprises a predictive modeling module that enables a fraud or risk manager to forecast losses based on accounts booked into the EFMT portfolio.

The entry into the system is via the menu shown in FIG. 2. Use of the EFMT 30 by the system user allows access to fraudi 32 which are detailed in the discussion of FIG. 3 hereinbelow. The fraudi are assigned singly or in groups, as appropriate, to each of the steps in the application life cycle; these steps are detailed extensively in FIGS. 5 through 8D hereinbelow.

Benchmarking routines 34 are included which give the system user access to historical trends, industry data, and other data so that a comparison of the user's credit card portfolio can be made to the industry results. An example of one entry into the benchmarking routines is shown in FIG. 9 where fraud loss ratios are calculated. The entry point for applicants seeking credit is through application data 36 which is provided by the applicant and amended by the credit card issuing authority. Credit bureau reports 38 allow the issuing authority to view an applicant's credit history and to apply that history to the credit granting steps of application processing as is detailed in FIGS. 6A and 6B. Credit card history 40 for a particular issued card is an after-issuance monitoring procedure that is detailed in FIGS. 7A and 7B; the data from the day-to-day monitoring of accounts serves as additional input for the assignment of fraudi 32. Account life cycle activity 42 is detailed in FIGS. 5 through 8D and serves as input for much of the processing and monitoring of the EFMT 30.

Figure 2A:
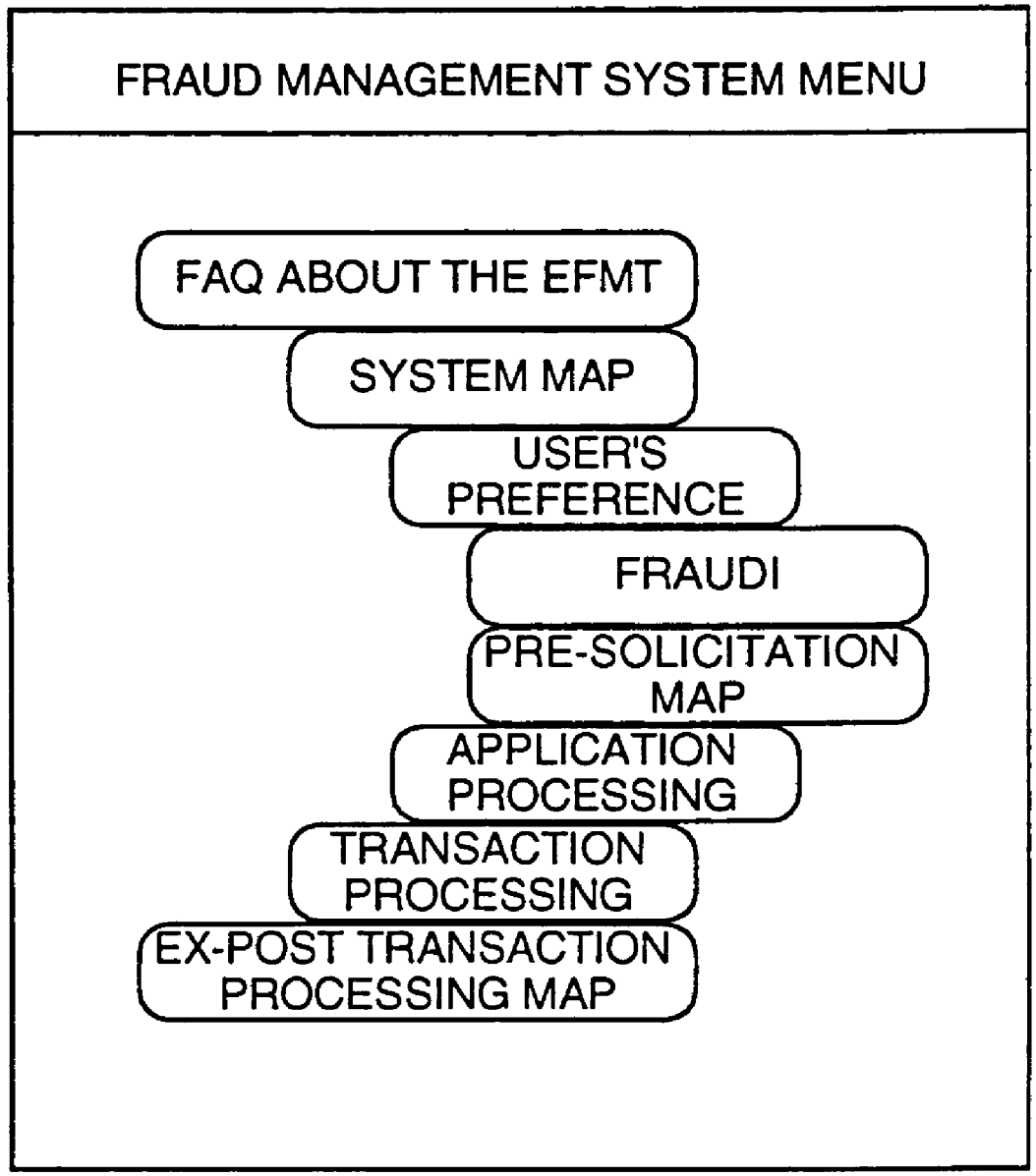
FIG. 2A is a block diagram of the Fraud Management System Master Menu which illustrates each of the component parts of the present invention.

FIG. 2A is a block diagram of the Fraud Management System Master Menu which illustrates each of the component parts of the present invention. The EFMT 30, which serves as the basis for the system, is a personal computer (PC) based information tool for managing fraud. The EFMT 30 is intended for the fraud manager/fraud analyst or other risk managers responsible for ensuring that there are measures in place to detect and manage fraud. The tool comprehensively covers the full life cycle of an account and its supporting functions and operations. The EFMT 30 encompasses internal and external fraud as well as functions performed by external vendors. In one particular embodiment of the EFMT 30, it is layered onto the EXCEL® spreadsheet program which is commercially available from MicroSoft Corporation of Redmond, Wash. The EFMT 30 features a Graphical User Interface (GUI) for performing a number of fraud management functions. The path within the system is shown in FIG. 2B.

Figure 2B:
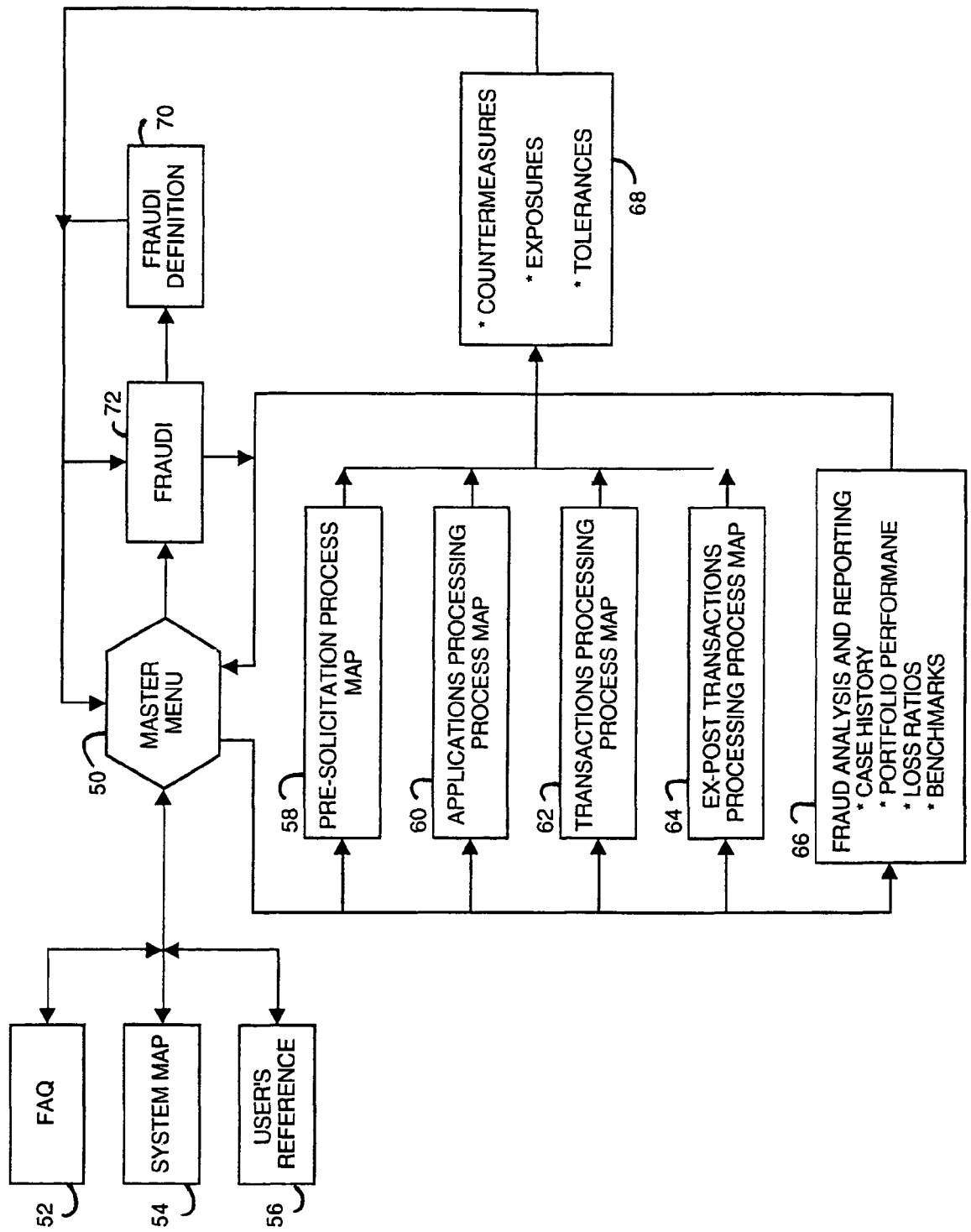
FIG. 2B, there is a system map for the Electronic Fraud Management Tool of the Fraud Management System.

Turning to FIG. 2B, there is shown a system map for the EFMT 30. All user sessions within the system begin with the Master Menu as is shown in FIG. 2A. The arrows indicate possible navigation paths between the elements. The Master Menu block 50 allows the system user to return to the Master Menu for entry into the system. The frequently asked questions (FAQ) block 52, system map 54, and user's reference 56 are all HELP modules selectable by the system user.

Figure 5:
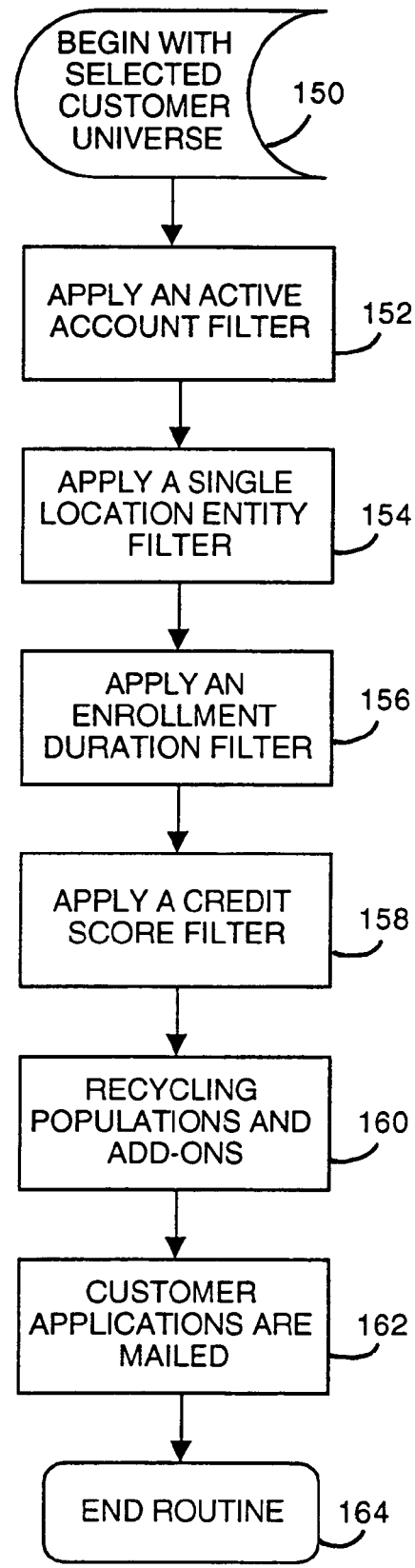
FIG. 5 is the series of steps of the detailed flowchart of the invention's method as it pertains to the pre-solicitation phase of an account life.
Figure 6A:
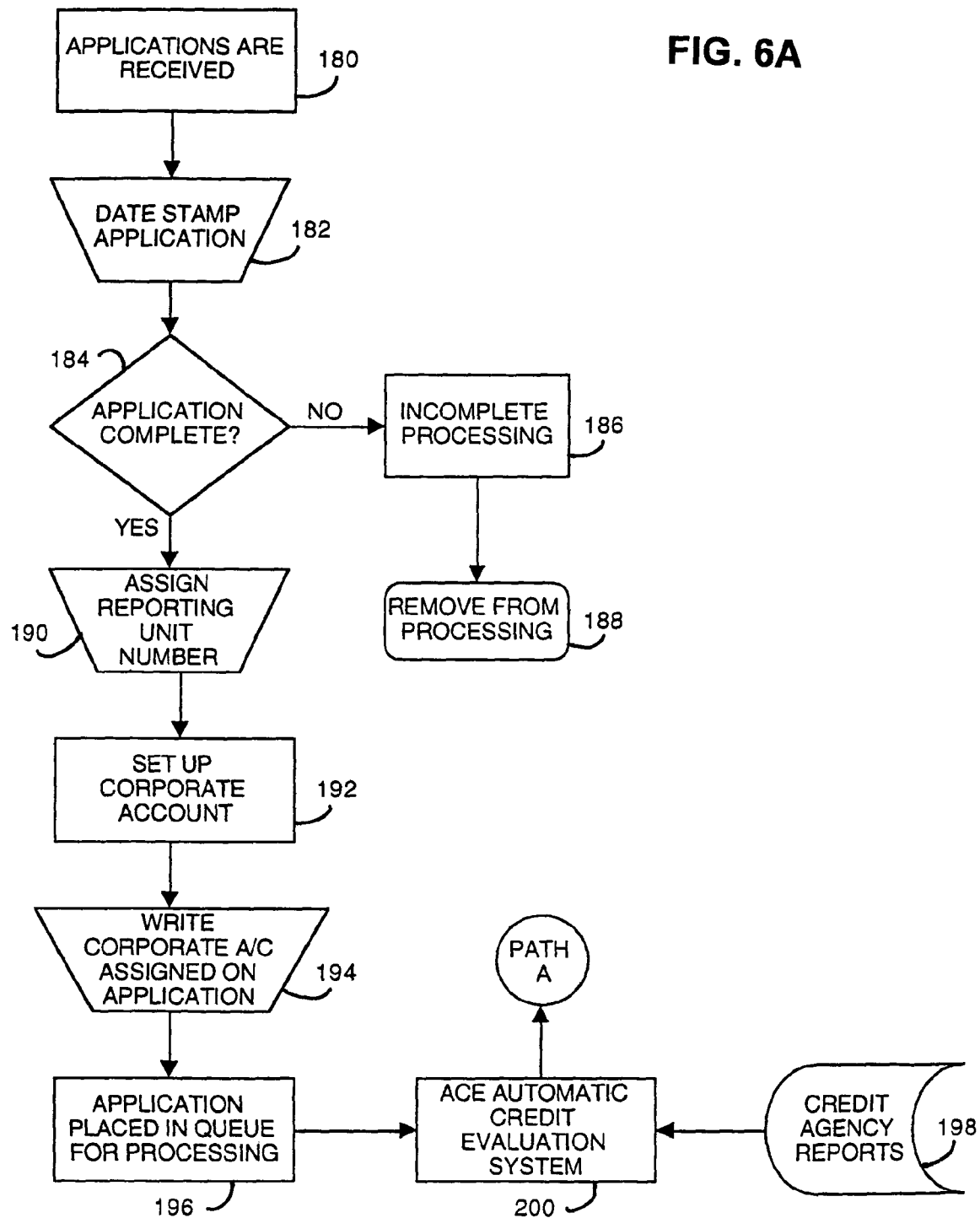
FIG. 6A is the beginning series of steps of the detailed flowchart of the invention's method as it pertains to the application processing phase of an account life.
Figure 6B:
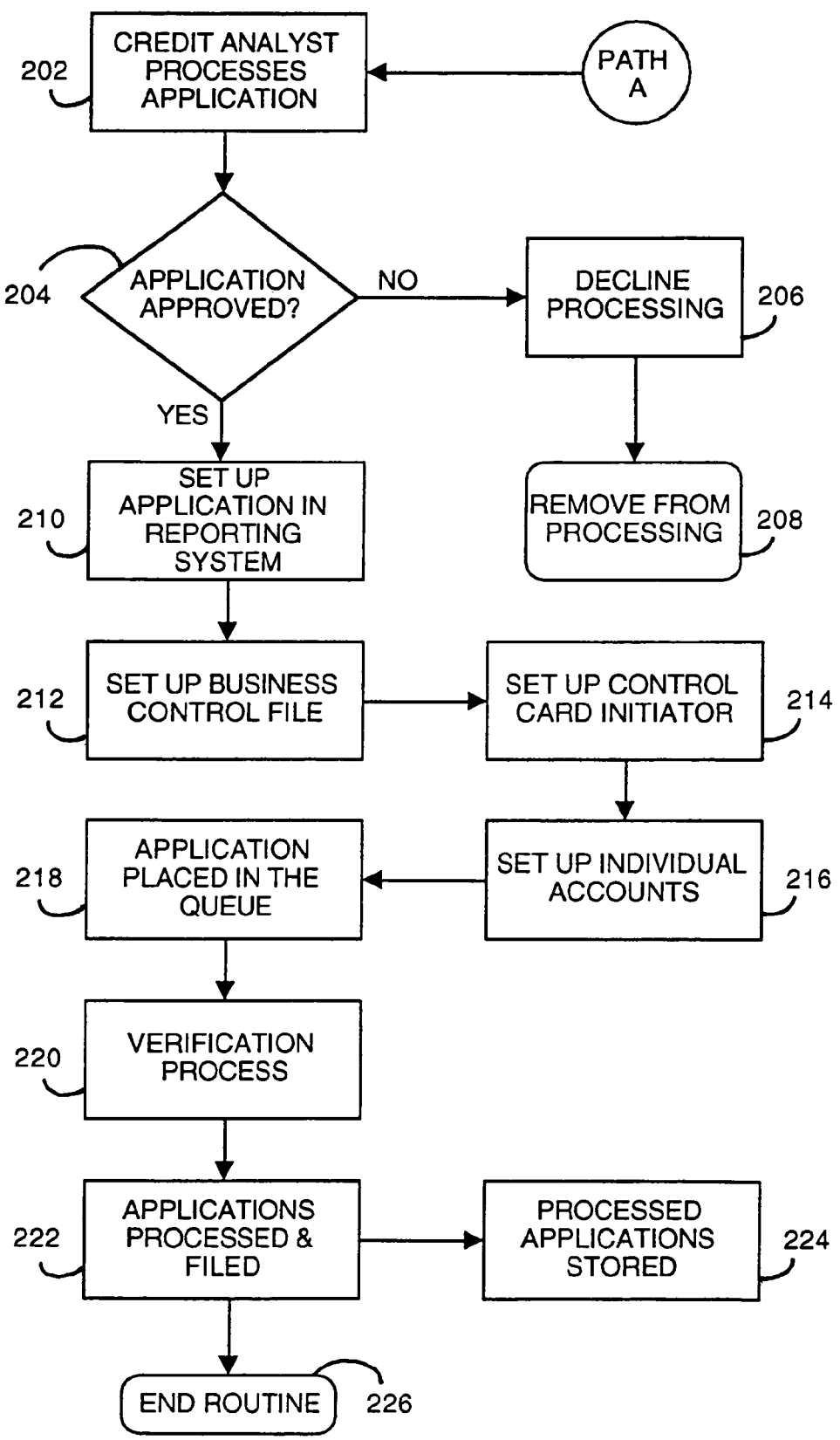
FIG. 6B is the concluding series of steps of the detailed flowchart of the invention's method as it pertains to the application processing phase of an account life.
Figure 7A:
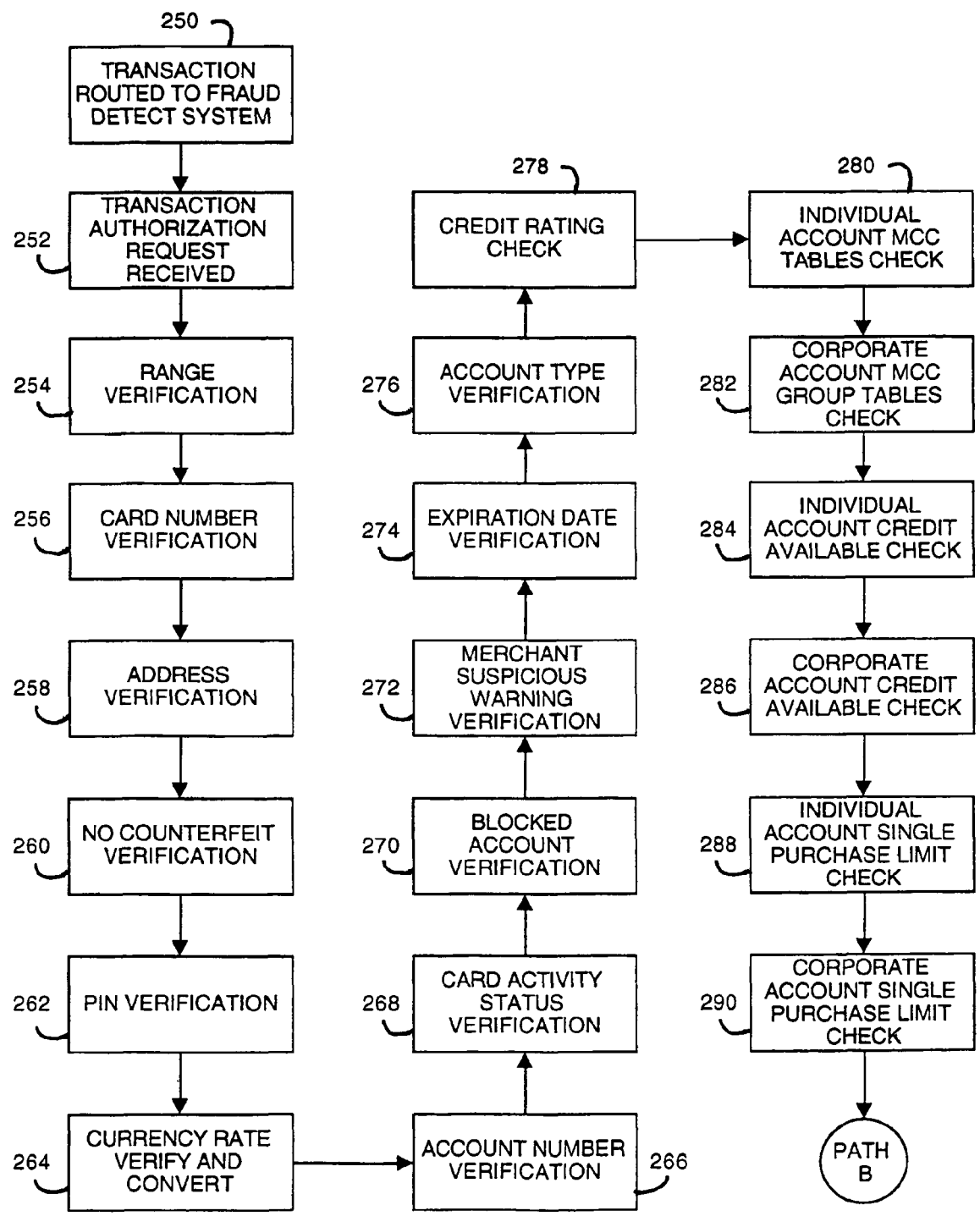
FIG. 7A is the beginning series of steps of the detailed flowchart of the invention's method as it pertains to the transactional phase of an account life.
Figure 7B:
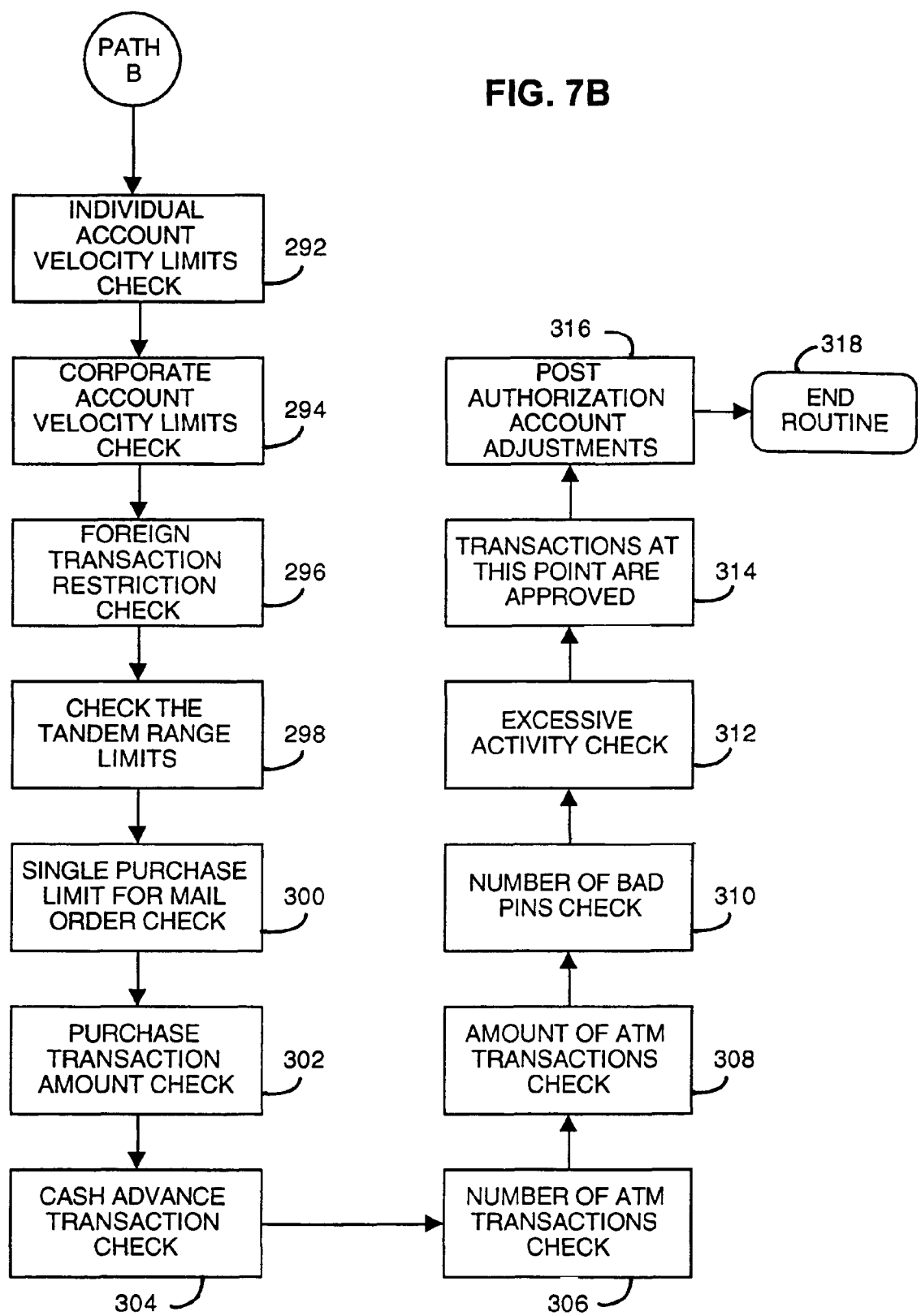
FIG. 7B is the concluding series of steps of the detailed flowchart of the invention's method as it pertains to the transactional phase of an account life.

From the Master Menu block 50 which is further illustrated in FIG. 2A, the system user can navigate to: the pre-solicitation process map 58, whose process is further described in FIG. 5; the applications processing process map 60, whose process is further detailed in FIGS. 6A and 6B; the transactions processing process map 62, whose process is further described in FIGS. 7A and 7B; and, the ex-post transactions processing process map 64, whose process is further described in FIGS. 8A through 8D.

The fraud analysis and reporting block 66 enables the system user to enter fraud case data, analyze fraud case history, perform benchmark analysis, and calculate portfolio performance ratios. The countermeasures, exposures, and tolerances represented in block 68 further detail for the system user which options are currently being employed by the system to detect and manage fraud. The fraudi definitions are found in block 70 and the fraudi listing follows in block 72.

Turning to FIG. 3, there is shown a table of elements referred to as fraudi, and a cross reference to each of their corresponding Industry Primary Fraud Types (hereinafter referred to as "IPFT").

The method of the present invention is centered upon the capture of one or more basic fraud elements. Such a basic element should be easily recognized as a basic fraud element and all required analyses be performed based on the definition of these elements. The term "fraudi" is descriptive of that class of basic elements.

Fraudi can be easily distinguished from well known fraud types. For instance, counterfeit credit card transactions are a fraud type that fall into the fraudi class. A customer service call requesting a change in a personal identification number (PIN), address, social security number, or phone number are not independently fraud types because they are not independently associated with any fraud losses. However, any one of these changes executed sequentially and coupled with the request for convenience checks or an additional credit card (hereinafter referred to as "plastic") which is exercised fraudulently may be one of several fraud types. Therefore, for the purposes of effectively managing fraud, a change in PIN, address, social security number. or phone number is defined as a fraudi because, depending upon subsequent account activity, they can be components that constitute what is recognized as a fraud type.

Thus, the value of the fraudi in analyzing fraud and risk is of particular importance because simple analyses that correlate the frequency or impact of a specific fraudi to some fraud type losses can be accomplished, thus enabling actions to be taken at the fraudi level. For fraudi that are also fraud types, benchmark comparisons can be made against industry data, thus allowing fraud to be managed at the portfolio level.

Fraudi is thus a key element of the Electronic Fraud Management Tool (hereinafter referred to as the "EFMT") disclosed herein. There are at present forty (40) fraudi utilized by the EFMT; they are listed in FIG. 2 herein, together with their corresponding Industry Primary Fraud Type (hereinafter referred to as "IPFT"). There are eight major fraud type categories recognized by the industry. A particular fraudi may be associated with more than one fraud type. The correlations between the fraudi and the IPFT that are listed represent the strongest or primary correlation between the fraudi and the IPFT.

The EFMT was constructed on the basis of four distinct processes that comprise the life cycle of an account. Each of the processes is mapped (see the detailed description for FIGS. 5 through 8D), and fraudi/fraud types mapped in the precise locations where they occur or are detected. By navigating through the maps, the system user can determine where most of the fraud/fraudi types occur or can be detected.

Figure 4:
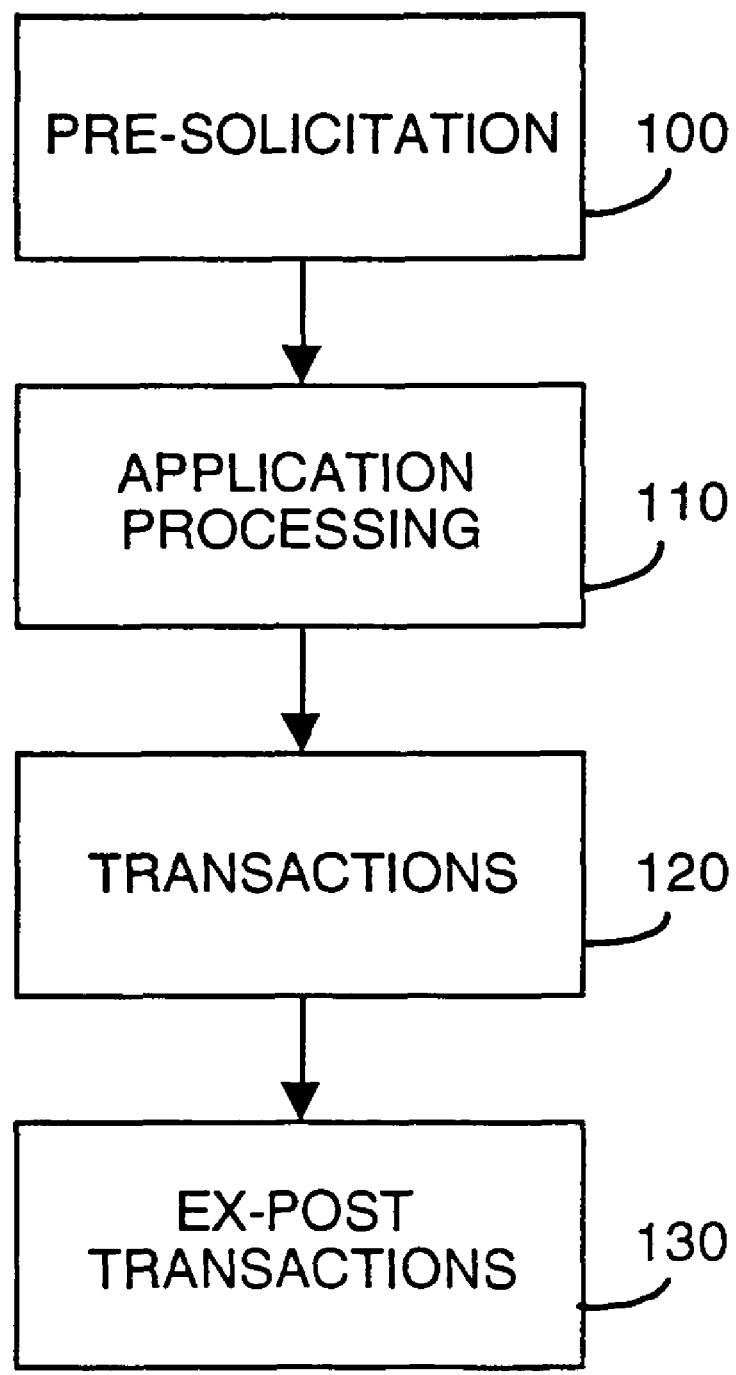
FIG. 4 is an upper level flowchart of the four phases of an account life cycle.

Turning to FIG. 4, there is shown an upper level flowchart of the four phases of an account life cycle: the pre-solicitation; application processing; transactional phase; and, the ex-post transactional stage. The account life cycle is an example of the environment in which the present invention is exists and is utilized.

In the pre-solicitation phase 100, an account is started with the identification of a potential customer. Potential customers are identified and mailed an application or invitation to apply for a credit card. Customers who desire a credit card submit their application to a receiving entity (hereinafter referred to as "the issuer"); it should be noted that the receiving entity can be the bank issuing the credit card, some form of cooperative financial venture, or a third party tasked with processing applications on behalf of actual issuing authority.

The applications are processed in the application processing phase 110 by entering account data at the issuer and accepting or declining the application, determining credit, obtaining credit bureau scores, etc. Applicants who are declined are sent a letter informing them of their status. Those applicants who are accepted are placed in a queue for embossing of the actual credit card and for the mailing out of their personal identification numbers (PINs). The issuer also reviews written credit line increases and other sensitive credit line account issues.

The account phase then moves to the transaction processing phase at step 120 where transaction processing begins the day the account owner completes the process of receiving the card, activating it, and actually using the card. All electronic transactions or authorization requests are routed through a processing entity for processing and approving the application. The authorization request process combines card validation, credit limit checks, fraud checks, and account limit maintenance processes that are executed in real time as an account holder is making a purchase or requesting a cash advance. Queues are developed for identifying fraudulent transactions and following up on the reporting of actual fraud to a data center.

All other account changes that are not related to the processing of a transaction are grouped into the ex-post transaction processing stage at step 130. Examples of certain activities that belong in this grouping are account name, address, phone number, and social security number changes. Account closures, questionable purchases or chargebacks, and the reporting of lost or stolen credit cards would also be included in this category.

FIG. 5 is a detailed flowchart of the method of conducting the pre-solicitation phase of the present invention. This phase is characterized by the significant features of targeting a business customer, assessing the credit strength of the customer's business, and making a measured assumption as to the correlation between the applicant's business credit performance and the individual's credit worthiness.

The phase begins at step 150 by identifying a customer universe from which a potential customer solicitation can be drawn. The method then advances to step 152 where the customer pool is filtered to determine whether or not any members of the customer pool are active customers and to remove those customers from the pool. From step 152, the method advances to step 154 where the customer pool is filtered for businesses that have only one location. The pool is then subjected, at step 156 to the application of an enrollment duration filter which assess the length of time that a particular customer has been enrolled in a qualifying business to business or similar program. The customer pool is further filtered at step 158 where a credit score filter is applied. One preferred embodiment of the present invention utilizes a FICO score to determine credit worthiness; this step is only performed when the name of the owner of the business is known. FICO scores are known in the art and a detailed description of these scores is not required for an understanding of the present invention.

The method advances from step 158 to step 160 where certain customers may be added to the filtered population. These "add-ons" might include customers that were previously targeted but did not respond to the solicitation. Special cases might be added on here as well. At the conclusion of step 160, the population to be solicited has been determined and the method can thus advance to step 162 where the customer list is processed and mailed either by the issuing authority or a third party. The mailing includes an invitation to apply for plastic. Responses to the invitation will be processed in the application processing phase. The routine is ended at step 164.

The application processing phase is shown as starting in FIG. 6A, where the beginning series of steps of the application processing phase of an account life are shown.

Applications for credit are received at step 180; these might be returned through a facsimile transmission, the postal service, or by courier. After receipt, the applications to are date-stamped at step 182 before the method advances to the query at step 184. The applications are reviewed for completeness; thus, at step 184, the method queries as to whether or not the application is complete. If the response to the query is "NO," then the incoming application will be deemed incomplete at step 186 and will be removed from processing at step 188. If, however, the response to the query at step 184 is "YES," then the method advances to step 190. It is during this advance that the first of the fraudi can be applied to the application; these are F15 and F17 (please see FIG. 3).

At step 190, applications are assigned a unique control/tracking number from a sequence kept off-line, though the assignation could be performed on-line if required. A corporate account is established for the application at step 192; this involves entering data that includes the business owner's social security number which will be used to pull a credit score. The method then advances to step 194 where an account code is assigned to the application before the application is placed, at step 196, in an electronic queue for processing by a credit analyst.

Using the corporate account code as a key, as well as the credit data supplied by the applicant, the application is categorized and moved to the appropriate queue. The ACE automatic credit evaluation system is employed at step 200 and, utilizing credit agency reports obtained from input 198, advances along Path A to step 202 as is shown in FIG. 6B.

FIG. 6B is the concluding series of steps of the detailed flowchart of the invention's method as it pertains to the application processing phase of an account life. In the figure, Path A is shown entering the method flow at step 202 where the credit analyst processes the application from its appropriate queue. It is at this step that fraudi F17 (please see FIG. 3) can be applied.

From step 202, the method advances to a query at step 204 which asks if the application has been approved. If the response to the query is "NO," then the method advances to step 206 where the decision to decline processing is made and the application subsequently removed from processing at step 208. The declination automatically triggers a letter of declination which is sent to the applicant. If, however, the response to the query at step 204 is "YES," then the method advances to step 210 where the application is set up in a reporting system that prepares relevant reports on a monthly basis.

Following set up in the reporting system, a business control file (BCF) is set up for each applicant at step 212. The BCF is used to define the processing parameters, type of billing, annual fees, new account defaults, etc. A control card initiator is then set up at step 214. This control card sets up transaction processing credit evaluation defaults. A tracking sticker is also physically attached to each application which contains a tracking number, a corporate account number, and a credit limit. Step 212 is not a required step because systems such as ACE have incorporated tracking parameters that mirror the steps.

At least one individual (person as opposed to the business) account is set up at step 216. Additional cardholders (plastic) are also set up individually with the appropriate credit limits put in place. Accounts which are processed default to the "approved" queue at step 218 before advancing to the verification process at step 220. When applications are advanced to the approved queue, the action automatically triggers an approval letter to the applicant. The plastic will subsequently be cut and activated. The verification step 220 is merely a final review of the approved application; once this step is complete, the application is physically filed at step 224 and the application processing phase completed at step 226. It is at this step that fraudi F18 (please see FIG. 3) can be applied. The applicant, upon becoming a cardholder is then eligible to being utilizing the plastic. Purchases made with the plastic are subject to the transactional phase of the account life.

Turning to FIG. 7A, there is shown the beginning series of steps of the detailed flowchart of the invention's method as it pertains to the transactional phase of an account life. Transaction processing occurs in four sequential stages; these are: pre-processing checks; transaction approval-authorization; post processing checks; and, post approval account adjustments.

The Pre-processing check is an authentication screen. It is the first level of identification and verification that every authorization request is subjected to. This check is detailed in the description of steps 254-274. Transaction approval-authorization establishes credit soundness, limits, and checks outstanding pre-specified transaction limits. This stage is detailed in the description of steps 276-298.

Prior to granting authorization, an issuing bank is required to define the response that is returned for selected edits in the authorization process. The post-processing checks include checking of the purchase transaction amount, cash advance transaction limit, number of automated teller machine (ATM) transactions for the day, etc. These checks are then compared to established limits prior to granting approval. These checks are detailed in the description of steps 300-312.

Post approval account adjustments allow for adjustment of available credit or the adjustment of velocity counters. These adjustments are described in steps 314-318.

Beginning at step 250, a transaction is routed to the fraud detection system. An example of a system of this type is the VISANET/CRIS System employed by VISA. It is at this step that fraudi F15, F16, F28, and F34 (please see FIG. 3) can be applied. The method advances from step 250 to step 252 where a transaction authorization request is received for processing. The transaction request is then sent through the pre-processing checks beginning at step 254.

At step 254, range verification checks to ensure that the account number is within a valid account number range. There is an action option that can be specified to decline out of range accounts. It is at this step that fraudi F14, F15, F16, F28, and F32 (please see FIG. 3) can be applied. The method then advances to step 256 where card number verification is performed; this step checks to ensure that the card number exists in the system. If the card number is not found, then the request is declined with an "Invalid Card" Message. It is at this step that fraudi F14, F15, F16, F28, and F32 (please see FIG. 3) can be applied. The method then advances to step 258 where address verification is performed. If address information is received on an authorization request, it is checked against information on the system. It is at this step that fraudi F14, F15, F16, and F28 (please see FIG. 3) can be applied.

Counterfeit fraud is then checked at step 260 by checking the encodings on the magnetic strp on the reverse side of the plastic. An example of these encodings is the card verification value (CVV) of VISA, or the card validation code (CVC) of MasterCard. It is at this step that fraudi F15, F16, F28, and F32 (please see FIG. 3) can be applied. If the authorization request included a personal identification number (PIN), the number is checked, at step 262, against the PIN on file. If the PIN is invalid, the request is declined with an "Invalid PIN" message. It is at this step that fraudi F15, F16, F27, F28, F32, F34, and F38 (please see FIG. 3) can be applied. If the currency of the authorization request does not match the currency of the issuer, the amount is converted at step 264. If there is not a currency exchange rate available, or if either the requested currency or the issuer currency is invalid, the request is referred with an "Invalid Currency Rate" message. It is at this step that fraudi F14 and F16 (please see FIG. 3) can be applied.

The method next advances to step 266 where the plastic's corresponding account number is checked; the account type (individual, control, or corporate) is also checked. If the account did not originate on an individual account, the request is declined. It is at this step that fraudi F14, F15, F16, F28, and F32 (please see FIG. 3) can be applied. The method then advances to step 268 where verification of the card activation status is verified. It is at this step that fraudi F14, F15, F16, F27, F28, and F32 (please see FIG. 3) can be applied. From this step, the method advances to step 270 where the account status and reason code information (which is viewable to the system user) are checked. It is at this step that fraudi F14, F15, F16, F31, F32, and F38 (please see FIG. 3) can be applied.

Step 272 allows a merchant originating the verification request to indicate a "Merchant Suspicious" warning as part of the request. It is at this step that fraudi F14, F16, F25, F28, and F33 (please see FIG. 3) can be applied. The card's expiration date is then checked and verified at step 274. This check verifies the expiration date of the plastic. This type of validation depends upon the options that are selected by the issuer for the range. If the system determines that the card has expired, then one of several referral options may be possible. It is at this step that fraudi F14 and F16 (please see FIG. 3) can be applied and that the pre-processing checks are concluded. The method then advances to step 276.

At step 276, the first of the transaction approval/authorization steps occurs. The account type verification at step 276 checks the account record type. If the account is an individual account, processing continues, Control and corporate account authorization requests are declined. It is at this step that fraudi F15 and F16 (please see FIG. 3) can be applied. The method then advances to the credit rating check at step 278 where credit ratings are used to indicate either derogatory or VIP account status. Special credit rating assignments take place in real time. Derogatory credit ratings are assigned to accounts to indicate that the card is lost or stolen, or that the account is fraudulent. A derogatory credit rating blocks activity on the account. If a corporate account is assigned a derogatory rating, all cardholders assigned to that corporate account are automatically declined. It is at this step that fraudi F14 and F16 (please see FIG. 3) can be applied.

The method next advances to step 280 where merchant category codes (MCC) can be used to limit transactions by individuals to certain merchants. Authorizations can be declined, referred, or diverted for control purposes. Additionally, a single MCC can be assigned a single purchase or velocity limit. It is at this step that fraudi F14, F16, and F37 (please see FIG. 3) can be applied. The method then advances from step 280 to step 282 where merchant category codes (MCC) can be used to limit transactions by corporate accounts to certain merchants. Authorizations can be declined, referred, or diverted for control purposes. Additionally, a single MCC can be assigned a single purchase or velocity limit. It is at this step that fraudi F14 and F16 (please see FIG. 3) can be applied. The individual account credit available check at step 284 is performed next. Credit available is checked by subtracting posted transactions and outstanding authorizations from the credit limit. If the authorization limit exceeds the credit available, then the authorization is declined or referred. It is at this step that fraudi F14, F16, F32, F34, and F37 (please see FIG. 3) can be applied. The corporate account credit available check at step 286 is similar in that credit available is checked by subtracting posted transactions and outstanding authorizations from the credit limit. If the authorization limit exceeds the credit available, then the authorization is declined or referred. It is at this step that fraudi F14 and F16 (please see FIG. 3) can be applied.

The individual account single purchase limit check is performed at step 288. The single purchase limit is the maximum dollar amount for a single purchase. A single purchase limit can be assigned to both the individual and corporate accounts, and cam be set for all account purchases. If the authorization amount exceeds the single purchase limit, authorization is declined or referred. It is at this step that fraudi F14, F16, F21, F34, and F37 (please see FIG. 3) can be applied. The corporate account single purchase limit check is performed at step 290. If the authorization amount exceeds the single purchase limit, authorization is declined or referred. It is at this step that fraudi F14 and F16 (please see FIG. 3) can be applied. The method then advances along Path B to re-enter the method flow at step 292 as is shown in FIG. 7B.

FIG. 7B is the concluding series of steps of the detailed flowchart of the invention's method as it pertains to the transactional phase of an account life. The steps for transaction approval/authorization are concluded in steps 292-298; the post-processing checks are detailed in the description of steps 300-312; and, the post-approval account adjustments are described in steps 314-318.

Path B is shown re-entering the method flow at step 292 where individual account velocity limits are checked. Velocity limits control the dollar amount of transactions within a specified time period. It is at this step that fraudi F14, F16, F21, F31, F32, F34, F37 and F38 (please see FIG. 3) can be applied. On individual and corporate accounts, velocities may be defined according to any one of several methods that include twenty-four (24) hour or monthly cycles. The velocity may also be measured for a specific number of days, with an indicated starting day and a refresh date. Corporate velocity limits are checked at step 294. It is at this step that fraudi F14 and (please see FIG. 3) can be applied.

Foreign transaction restrictions are checked at step 296. This parameter enables businesses to put restrictions on purchases that are made in foreign countries. Transactions can be made at the individual and corporate account levels. Restrictions are set up by country code. It is at this step that fraudi F14, F16, F28, F31, F34 and F35 (please see FIG. 3) can be applied. The method then advances to step 298 where the TANDEM range limits are checked. Each bank acting as an issuer has certain range limits specified on the TANDEM system, Each authorization request is routed to the issuing bank's account to determine the appropriate limits. The request must meet all parameters in order to be passed through to the post-processing checks. It is at this step that fraudi F16 (please see FIG. 3) can be applied.

The post processing checks begin at step 300 where the single purchase limit for mail order check is employed. If the authorization request is for a mail order transaction, the amount requested is checked against the mail order limit on the TANDEM range control file. If the amount exceeds the specified limit, the authorization request is declined or referred. It is at this step that fraudi F14, F16, F21, F34, F36, F37, F38 and F40 (please see FIG. 3) can be applied. The method then advances to the purchase transaction amount check at step 302. If the authorization is not for a mail order transaction, the purchase amount is checked against the TANDEM range control file limits. If the amount exceeds the specified limit, then the request is declined or referred. It is at this step that fraudi F14, F16, F21, F34, F37 and F38 (please see FIG. 3) can be applied.

At step 304, the cash advance transaction check is used to determine whether or not a cash advance request exceeds the cash advance limits. If the request exceeds the specified limits, then the request is declined or referred. It is at this step that fraudi F16, F21, F32, F37, and F38 (please see FIG. 3) can be applied. The method then advances to step 306 where the number of ATM transactions check is used to determine whether or not the total number of ATM transactions for the day exceeds the set limits. If the request exceeds the specified limits, then the request is declined or referred. It is at this step that fraudi F16, F32, F34, F37, and F38 (please see FIG. 3) can be applied. The check of the dollar amount of total ATM transactions for the day is performed at step 308, where if the total dollar amount of ATM transactions for the day exceeds the set limits then the request is declined or referred. It is at this step that fraudi F16, F32, F34, F37, and F38 (please see FIG. 3) can be applied.

A number of bad PINs check is performed at step 310. If the authorization request contains an invalid PIN, and the maximum number of bad PIN entries on the TANDEM range control file is exceeded, the request is denied. It is at this step that fraudi F16, F32, F34, and F38 (please see FIG. 3) can be applied. An excessive activity check is then performed at step 312, where the TANDEM range control can be used to define excessive activity by transaction type. The limits can be set in terms of the number of transactions or by total dollar amount. It is at this step that fraudi F16, F16, F31, F32, F34, F37 and F38 (please see FIG. 3) can be applied.

Transactions that have made it through step 312 without being declined are approved at step 314. Post authorization account adjustments are made at step 316 to the account for a lowering of available credit to reflect the authorization approval. The routine is then ended at step 318.

Figure 8A:
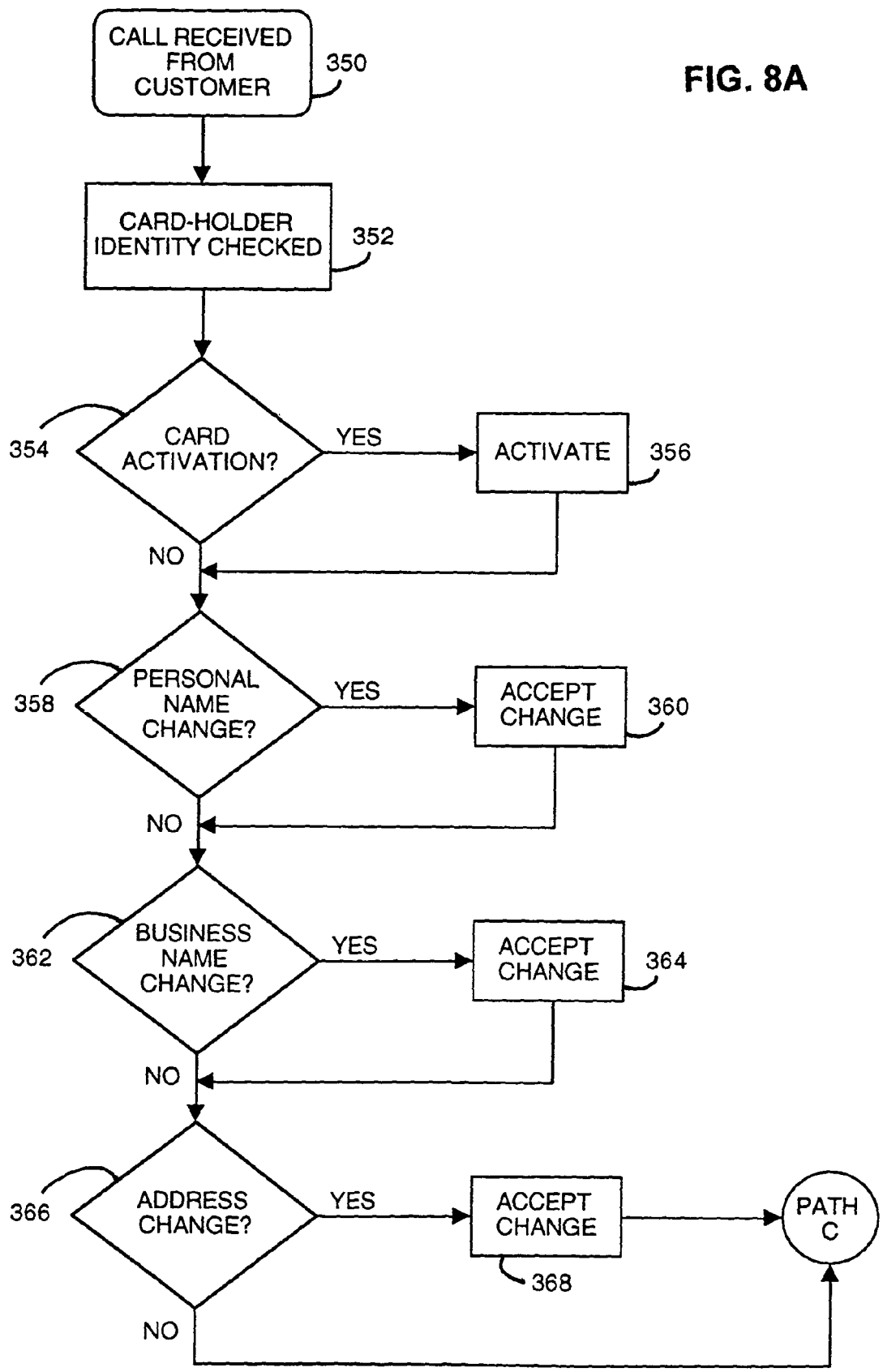
FIG. 8A is the beginning series of steps of the detailed flowchart of the invention's method as it pertains to ex-post transactions.

FIG. 8A is the beginning series of steps of the detailed flowchart of the invention's method as it pertains to ex-post transactions. This phase includes all account activity that is not an actual transaction.

The flow begins at step 350 where a call or other communication is received from a customer. The identity of the cardholder is established at step 352. Cardholder identity is established by requiring the caller's social security number and mother's maiden name. Alternative procedures can be established as well. It is at this step that fraudi F3, F4, F5, F6, F9, F10, F12, F13, F16, F19, F24, F26, F27, F29, F30 and F38 (please see FIG. 3) can be applied and that the customer and the issuer representative can perform one or more of the account changes and/or functions available in steps 354 through 410.

Beginning at step 354, the method queries as to whether or not the customer wants to activate their card. It is at this step that fraudi F16, F24, F27 and F31 (please see FIG. 3) can be applied. If the response to the query is "YES," then the card is activated at step 356 before advancing to the query at step 358. If the response to the query at step 354 is "NO," however, then the method advances directly to the query at step 358.

At step 358, the method queries as to whether or not the customer wants to change their name as it is listed on the account. It is at this step that fraudi F12, F16, F27 and F31 (please see FIG. 3) can be applied. If the response to the query is "YES," then the name change is made at step 360 before advancing to the query at step 362. If the response to the query at step 358 is "NO," however, then the method advances directly to the query at step 362.

At step 362, the method queries as to whether or not the customer wants to change the business name as it is listed on the account. It is at this step that fraudi F6, F16, F27 and F31 (please see FIG. 3) can be applied. If the response to the query is "YES," then the name change is made at step 364 before advancing to the query at step 366. If the response to the query at step 362 is "NO," however, then the method advances directly to the query at step 366.

Figure 8B:
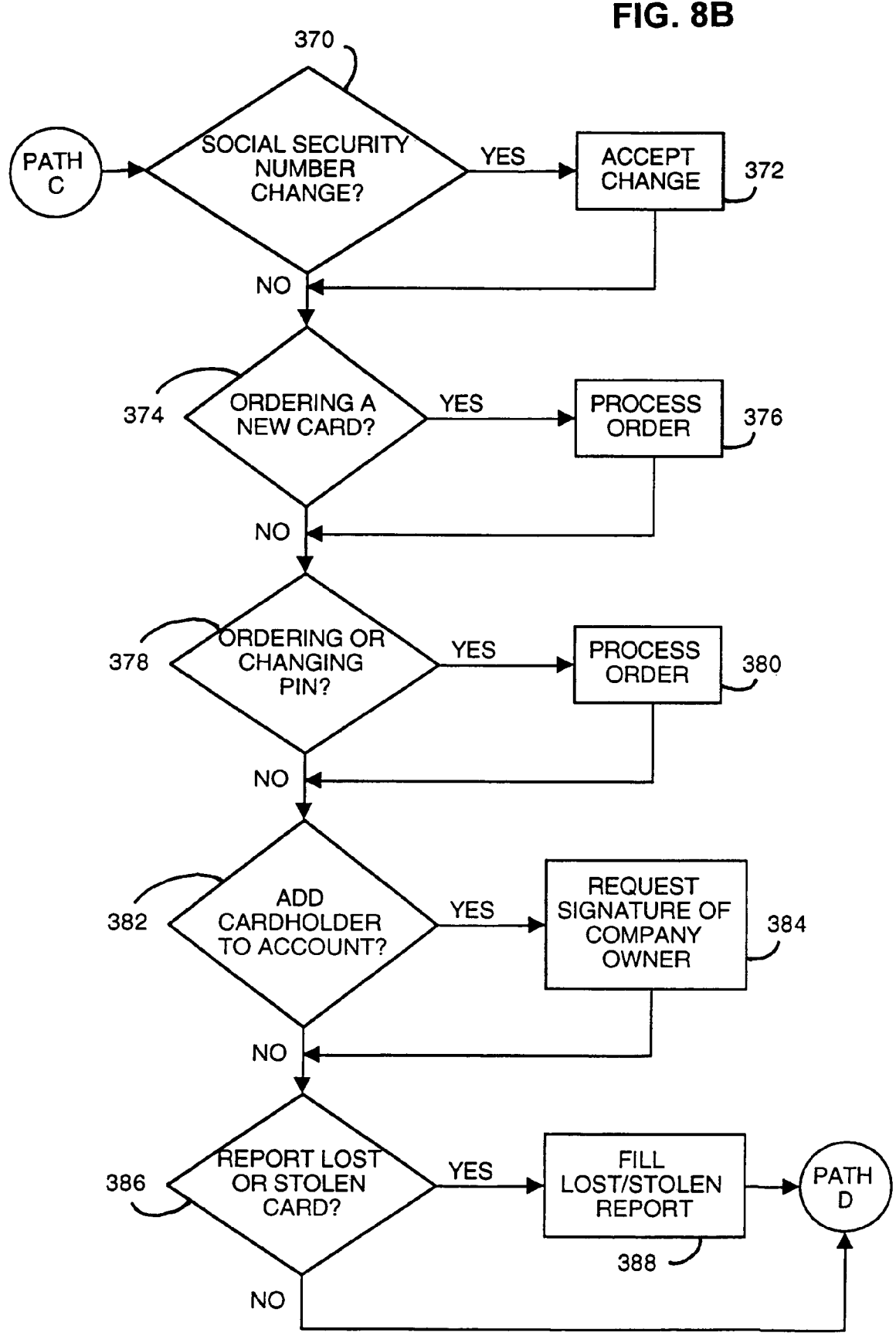
FIG. 8B is the continuation of the detailed flowchart of the invention's method as it pertains to ex-post transactions.

At step 366, the method queries as to whether or not the customer wants to change their address as it is listed on the account. It is at this step that fraudi F3, F5, F16, F27 and F31 (please see FIG. 3) can be applied. If the response to the query is "YES," then the address change is made at step 368 before advancing along Path C to the query at step 370 as is shown in FIG. 8B. If the response to the query at step 366 is "NO," however, then the method advances directly along Path C to the query at step 370.

FIG. 8B is the continuation of the detailed flowchart of the invention's method as it pertains to ex-post transactions. The method flow continues with the entry of Path C at step 370.

Beginning at step 370, the method queries as to whether or not the customer wants to change their social security number as it appears on their account. It is at this step that fraudi F13, F16, F27 and F31 (please see FIG. 3) can be applied. If the response to the query is "YES," then the social security number change is made at step 372 before advancing to the query at step 374. If the response to the query at step 354 is "NO," however, then the method advances directly to the query at step 374.

At step 374, the method queries as to whether or not the customer wants to order a new card. It is at this step that fraudi F4, F26 and F30 (please see FIG. 3) can be applied. If the response to the query is "YES," then the new card request is processed at step 376 before advancing to the query at step 378. If the response to the query at step 374 is "NO," however, then the method advances directly to the query at step 378.

At step 378, the method queries as to whether or not the customer wants to order or change a PIN as it is listed on the account. It is at this step that fraudi F9, F16, F27 and F31 (please see FIG. 3) can be applied. If the response to the query is "YES," then the PIN order/change is processed at step 380 before advancing to the query at step 382. If the response to the query at step 378 is "NO," however, then the method advances directly to the query at step 382.

At step 382, the method queries as to whether or not the customer wants to add another cardholder to the account. It is at this step that fraudi F4 (please see FIG. 3) can be applied. If the response to the query is "YES," then the new cardholder is added after written approval by the business owner at step 384 before advancing to the query at step 386. If the response to the query at step 382 is "NO," however, then the method advances directly to the query at step 386.

Figure 8C:
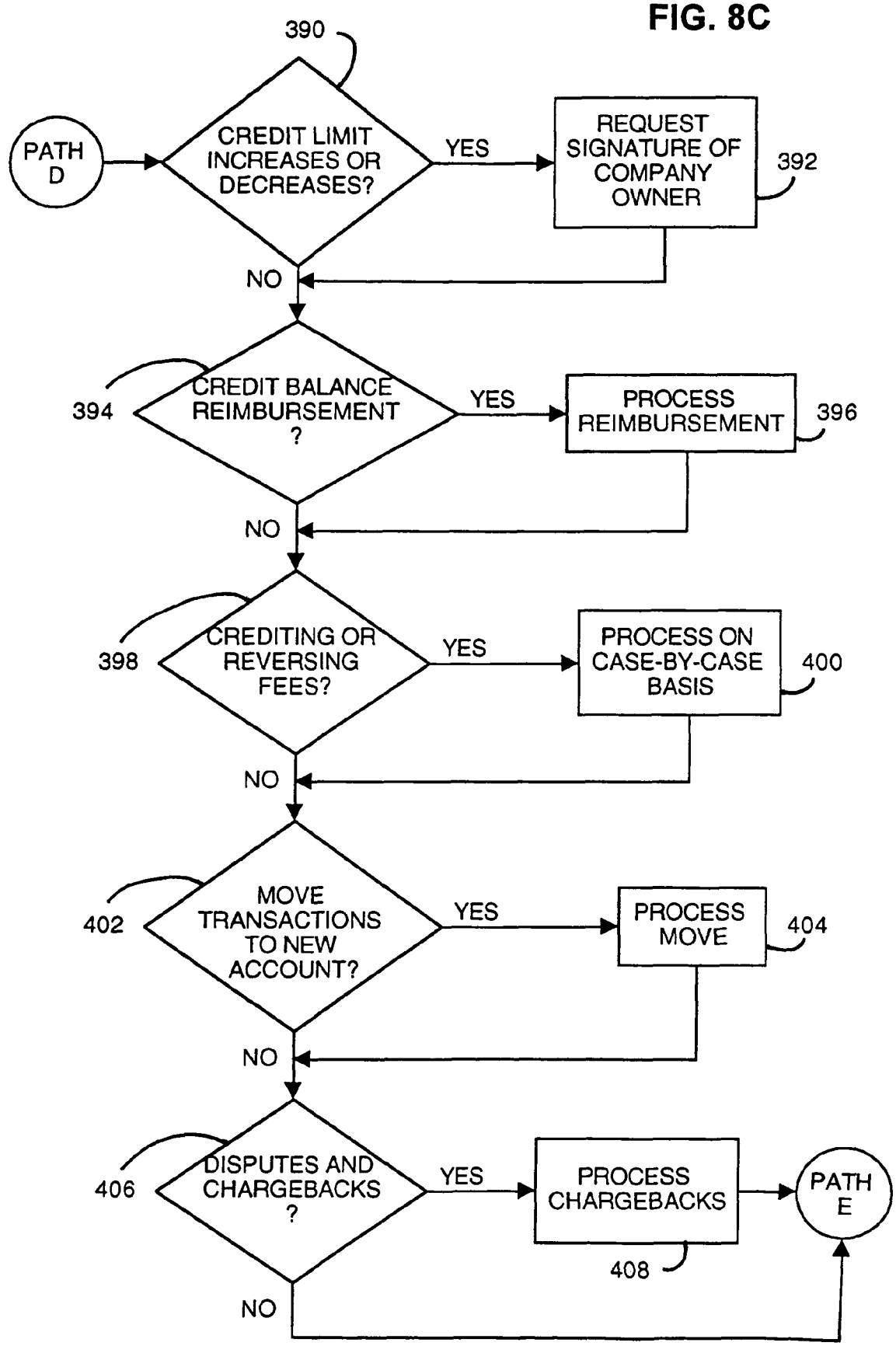
FIG. 8C is the continuation of the detailed flowchart of the invention's method as it pertains to ex-post transactions.

At step 366, the method queries as to whether or not the customer wants to report a lost or stolen card. It is at this step that fraudi F19, F27, F29 and F31 (please see FIG. 3) can be applied. If the response to the query is "YES," then a lost/stolen card report is filled out and processed at step 388 before advancing along Path D to the query at step 390 as is shown in FIG. 8C. If the response to the query at step 386 is "NO," however, then the method advances directly along Path D to the query at step 390.

FIG. 8C is the continuation of the detailed flowchart of the invention's method as it pertains to ex-post transactions. The method flow continues with the entry of Path D at step 390.

Beginning at step 390, the method queries as to whether or not the customer wants to increase or decrease their account's credit limit. It is at this step that fraudi F10 and F27 (please see FIG. 3) can be applied. If the response to the query is "YES," then the limit change is processed with the written approval of the business owner at step 392 before advancing to the query at step 394. If the response to the query at step 390 is "NO," however, then the method advances directly to the query at step 394.

At step 394, the method queries as to whether or not the customer wants to get a credit balance reimbursement. If the response to the query is "YES," then the reimbursement is processed at step 396 before advancing to the query at step 398. If the response to the query at step 394 is "NO," however, then the method advances directly to the query at step 398.

At step 398, the method queries as to whether or not the customer wants to get a credit or a reversal of fees that have been applied to the account. It is at this step that fraudi F33 (please see FIG. 3) can be applied. If the response to the query is "YES," then the credit or reversal is processed at step 400 before advancing to the query at step 402. If the response to the query at step 398 is "NO," however, then the method advances directly to the query at step 402.

At step 402, the method queries as to whether or not the customer wants to move transactions to a new or different account. If the response to the query is "YES," then the transactions are moved at step 404 before advancing to the query at step 406. If the response to the query at step 402 is "NO," however, then the method advances directly to the query at step 406.

Figure 8D:
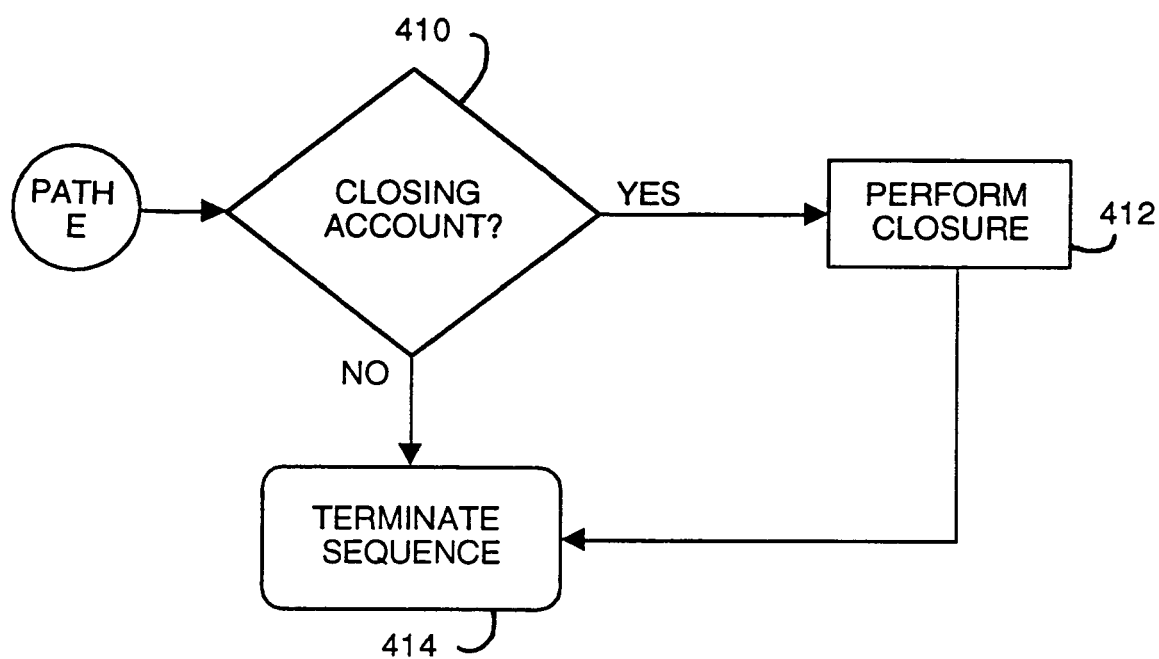
FIG. 8D is the conclusion of the detailed flowchart of the invention's method as it pertains to ex-post transactions.

At step 406, the method queries as to whether or not the customer wants to log a dispute or a chargeback to the account. It is at this step that fraudi F2, F11 and F33 (please see FIG. 3) can be applied. If the response to the query is "YES," then is made at step 408 before advancing along Path E to the query at step 410 as is shown in FIG. 8D. If the response to the query at step 406 is "NO," however, then the method advances directly along Path E to the query at step 410.

FIG. 8D is the conclusion of the detailed flowchart of the invention's method as it pertains to ex-post transactions. The method flow continues with the entry of Path E at step 410.

Beginning at step 410, the method queries as to whether or not the customer wants to close the account. It is at this step that fraudi F1 and F7 (please see FIG. 3) can be applied. If the response to the query is "YES," then the account is closed at step 412 before advancing to at step 414 where the ex-post procedure is concluded. If the response to the query at step 410 is "NO," however, then the method advances directly to step 414.

FIG. 9 is a block diagram of the application screen that allows a system user to determine fraud loss ratios as a means for benchmarking risk management effectiveness. The ratios and methodologies for each of the targeted ratios is as follows:

$Flo = \dfrac{\text{Fraud Losses}}{\text{Outstanding}}$    Flo measures fraud losses as a function of total outstandings. The total outstandings is interpreted as a general measure of the portfolio maturity. This is used for benchmarking total fraud.

$Flv = \dfrac{\text{Fraud Losses}}{\text{Volume}}$    Flv measures fraud losses as a function of volume of total sales. The total sales number is interpreted as an index of transaction activity. This is used for benchmarking transaction fraud.

$Flc = \dfrac{\text{Fraud Losses}}{\text{Total Charge} - \text{Offs}}$    Flc is an indicator of the contribution fraud losses make to total charge-offs.

$Le = \dfrac{\square(\text{Fraudulent Credits} - \text{Fraudulent Losses})}{\text{Fraudulent Credits}}$ $FLp = \text{Fradulent} - \text{Fraudulent Losses}$ While certain embodiments have been described above in terms of the system within which the method may reside, the invention is not limited to such a context.

FIG. 10 is a flow chart describing the method utilized to perform this invention. After the program starts, the program goes to block 900. In block 900, the program performs an application procedure, comprising a check of the creditworthiness of one or more selected customers; and issuing a financial product to said customer if said customer is determined to be creditworthy, thus resulting in an accepted customer, and declining said application if said customer is determined to be not creditworthy. Then the program goes to block 901 to assess a credit authorization request from a merchant or a system user, where said request is initiated by a user of said financial product. Now the program goes to block 902 to select a fraudi from a list comprising one or more fraudi and wherein said each one of said fraudi is representative of a defined area of risk. Then the program goes to block 903 to apply the selected fraudi to each one of said assessment steps. Then the program goes to block 904 to utilize a predictive modeling routine to perform said assessment. Now the program goes to block 905 to accept or decline said credit authorization request as based upon an outcome of said assessment. Then the program goes to block 906 to download said assessment result to said data processing system for transfer to a database accessible by one or more remote nodes of said system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing and assessing a set of risks relative to a financial product, said method being accessed through a data processing system, wherein said data processing system comprises a series of nodes operatively connected with each other, said method comprising the steps of:
    (a) performing an application processing procedure on one or more customers, comprising a check of the creditworthiness of one or more selected customers; and issuing a financial product to one or more of said customers if said selected customer is determined to be creditworthy, thus resulting in an accepted customer, and declining said application if said customer is determined to be not creditworthy;
    (b) assessing a credit authorization request from a system user, wherein said request is initiated by a use of said financial product;
    (c) utilizing a predictive modeling routine to perform said assessment;
    (d) accepting or declining said credit authorization request as based upon an outcome of said assessment;
    (e) downloading, by a computer, an assessment result to said data processing system for transfer to a database accessible by one or more remote nodes of said system;
    (f) applying, by a computer, a fraud indicator to said assessment and wherein said fraud indicator is selected from a list of fraud indicator and wherein each of said fraud indicator on the list is representative of a defined area of risk; and
    (g) determining, by a computer, fraud loss ratios to benchmark risk management effectiveness.

2. The method of claim 1, wherein said financial product is a credit card.

3. The method of claim 1, wherein said accepted customer is a business entity.

4. The method of claim 1, wherein said accepted customer is an individual and wherein an account is representative of a business affiliation and said set of risks is a function of an individual's profile.

5. The method of claim 1, wherein said accepted customer is an individual and wherein an account is representative of a business affiliation and said set of risks is a function of a business' profile.

6. The method of claim 1, wherein said accepted customer is an individual, and wherein an account is representative of an individual's and a business' affiliation, and said set of risks is a function of an individual's profile and a business' profile.

7. The method of claim 1, wherein a set of data relative to said credit authorization request is retained in a memory of said data processing system and utilized to determine the effectiveness of an assessment methodology.

8. The method of claim 1, wherein a filtering step comprises a credit score filter for eliminating a portion of a population that does not pass through said filter.

9. The method claimed in claim 1, further including the steps of:
    measuring fraud loses as a function of a portfolio maturity.

10. The method claimed in claim 1, further including the step of:
    measuring fraud losses as a function of volume of total sales.

11. The method claimed in claim 1, further including the step of:
    determining a contribution of fraud losses in total charge offs.

12. The method claimed in claim 1, wherein the fraud indicator is selected from the group consisting of a change in social security number, a change in personal identification number, a change of address, a change of phone number, account closures, questionable purchases, and questionable chargebacks.

* * * * *